US 6,595,666 B1

(12) United States Patent
Exilien

(10) Patent No.: US 6,595,666 B1
(45) Date of Patent: Jul. 22, 2003

(54) ORIENTATION SENSITIVE LIGHT FOR MOUNTING ON MOTORCYCLES AND THE LIKE

(76) Inventor: Georges Exilien, 51 Wetmore Rd., Mattapan, MA (US) 02126

( * ) Notice: Subject to any disclaimer, the term of this patent is extended or adjusted under 35 U.S.C. 154(b) by 0 days.

(21) Appl. No.: 10/062,851

(22) Filed: Jan. 31, 2002

(51) Int. Cl.⁷ ................................................ F21V 21/29
(52) U.S. Cl. ...................... 362/464; 362/475; 362/276; 362/802
(58) Field of Search ............... 362/464, 475, 362/276, 802

(56) References Cited

U.S. PATENT DOCUMENTS

| 2,732,540 A | 1/1956 | MacMahon |
| 2,732,541 A | 1/1956 | MacMahon |
| 3,824,541 A | 7/1974 | Nolan |
| 3,878,387 A | 4/1975 | Kovacic |
| 3,895,197 A | 7/1975 | Mizrahi |
| 4,363,022 A | 12/1982 | Manacci |
| 5,672,856 A | 9/1997 | Kolb et al. |
| 5,722,759 A * | 3/1998 | Eklov et al. ................ 362/464 |
| 5,767,775 A | 6/1998 | Shukla et al. |
| 5,920,046 A | 7/1999 | Takagi |
| 6,059,431 A | 5/2000 | Ellis, Jr. |
| 6,286,982 B1 | 9/2001 | Tashiro |

* cited by examiner

Primary Examiner—Sandra O'Shea
Assistant Examiner—Guiyoung Lee
(74) Attorney, Agent, or Firm—Lambert & Associates; Gary Lambert; Ed Timmes

(57) ABSTRACT

An orientation sensitive light for mounting on motorcycles and the like, having a light emitter, an orientation sensitive switch, and a power source, all connected in an electric circuit. The light is mounted on the underside of the motorcycle or on a side of the motorcycle, with the light emitter pointing downwards during normal operational orientation of the motorcycle. An orientation sensitive switch has a cavity with a quantity of an electrically conductive liquid such as mercury. The switch activates the light emitter when the motorcycle changes its orientation, as when a front or a rear wheel is raised above the ground.

14 Claims, 6 Drawing Sheets

ORIENTATION SENSITIVE LIGHT FOR MOUNTING ON MOTORCYCLES AND THE LIKE

FIELD OF THE INVENTION

This invention relates to orientation sensitive light emitting devices mounted on motorcycles and the like. Specifically, the disclosed device activates a light emitter, such as a lamp, when a rider induces the motorcycle to achieve an orientation in which one of the wheels of the motorcycle is raised above the level of the other wheel.

One danger of performing various acrobatic maneuvers on a motorcycle or a bicycle is that, in the night, when the rider raises front wheel above the ground, the motorcycle becomes less visible to other drivers since motorcycle's headlights point toward the sky and the taillights point downwards. Same problem exists when the rider performs a maneuver of raising a rear wheel above the ground. The rider becomes more vulnerable to being hit by a car since the drivers are less aware of the presence of rider on the road without seeing the motorcycle lights. Additionally, when the rider raises the front wheel, he becomes less aware of what is in front of the motorcycle since the headlight is now pointing upward as opposed to in front of the motorcycle.

In the past, a variety of light emitting devices for mounting on vehicles such as motorcycles were disclosed. In addition to well-known headlights and taillights, there exists prior art directed to lights that activate only upon existence of a certain pre-selected condition. For example, Mizrai in U.S. Pat. No. 3,895,197 discloses a vehicle mounted light which activates upon a change in the acceleration of the vehicle. Another patent by Manacci, U.S. Pat. No. 4,363,022, discloses a motorcycle turn signal which turns off when motorcycle resumes an upright orientation after completing a turn. Similarly, orientation sensitive switches have been described in prior art. Nolan, in U.S. Pat. No. 3,824,541, discloses a pair of angularly positioned mercury switches adapted to actuate the bicycle alarm upon unauthorized movement of the bicycle. Also, Kolb et al., in a U.S. Pat. No. 5,672,856, discloses a tilt switch made by attaching two electrically conductive members to a non-conducting tube and disposing a conductive sphere within the switch. However, none of these devices are aimed at solving the above discussed problems present when a rider performs acrobatic maneuvers in the nighttime.

The only known attempt to solve the problem faced by riders who perform acrobatic tricks on their motorcycles is a light manufactured by a company named "Star Boyz". This light is mounted on a motorcycle and has a manual activation switch. When activated, the light shines in the downward direction during normal operational orientation of the motorcycle. This device has a major drawback of having a manual switch. With this device, the rider is distracted from the road and needs to remember to turn the light on prior to lifting of one wheel and to turn it off after the raised wheel returns to the ground level.

What is needed is a light emitter mounted on a motorcycle, designed to shine light behind or in front of the motorcycle when the rider performs wheel raising maneuvers without a need to manually activate the light.

SUMMARY OF THE INVENTION

The present invention represents an orientation sensitive light for mounting on motorcycles and the like, having a light emitter, an orientation sensitive switch, and a power source, all connected in an electric circuit. The light is mounted on the underside of the motorcycle or on a side of the motorcycle, with the light emitter pointing in the downward direction with respect to the horizontal plane of the vehicle. An orientation sensitive switch has a cavity with a quantity of an electrically conductive liquid such as mercury. The switch activates the light emitter when the motorcycle changes its orientation, as when a front or a rear wheel is raised above the ground. When the front wheel is raised, the horizontal plane of the vehicle is no longer substantially parallel to the ground but is at an angle, thereby shining the light ahead of the motorcycle.

In a preferred embodiment, components of the light are stored inside of a housing member.

Therefore, it is the object of the present invention to provide an orientation sensitive light for motorcycles and the like capable of activating upon raising of a front or rear wheel above the ground.

It is another object of the present invention to provide an orientation sensitive light for motorcycles and the like having an orientation sensitive switch.

It is another object of the present invention to provide an orientation sensitive light for motorcycles and the like which does not become activated during normal operational orientation of the motorcycle.

It is yet another object of the present invention to provide an orientation sensitive light for motorcycles and the like wherein the light alerts other drivers of presence of a motorcycle on the road when rider raises front or rear wheel.

BRIEF DESCRIPTION OF DRAWINGS

These and other features, aspects and advantages of the present invention will become better understood with reference to the following description, appended claims, and accompanying drawings where:

DESCRIPTION OF THE INVENTION

Figure 1:
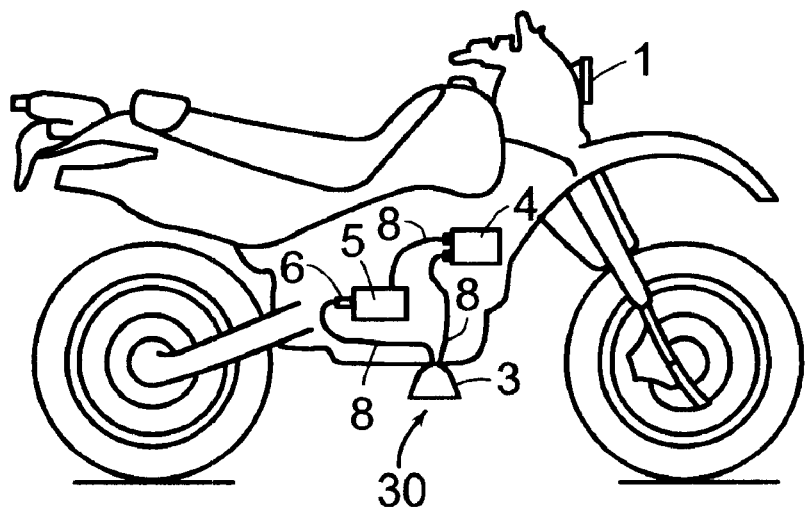
FIG. 1 is a side view of one of the embodiments of the orientation sensitive light for motorcycles and the like mounted on a motorcycle, wherein the motorcycle is shown in a normal operational orientation.

This invention represents an orientation sensitive light 30 for motorcycles 1 and the like as depicted in FIGS. 1–4. The basic components of the light 1 are a light emitter 3, electric power source 4 such as a battery, and a switch compartment 5, all interconnected in an electric circuit with wires 8. Alternatively, the electric power source could be the vehicle 1 battery. The light 30 components are mounted on a vehicle 1 with means for attachment well known in the art. The light emitter 3 is a lamp or the like pointing downwards with respect to the horizontal plane of the vehicle. During normal operational orientation of the vehicle 1, this plane is substantially parallel to the ground.

Figure 2:
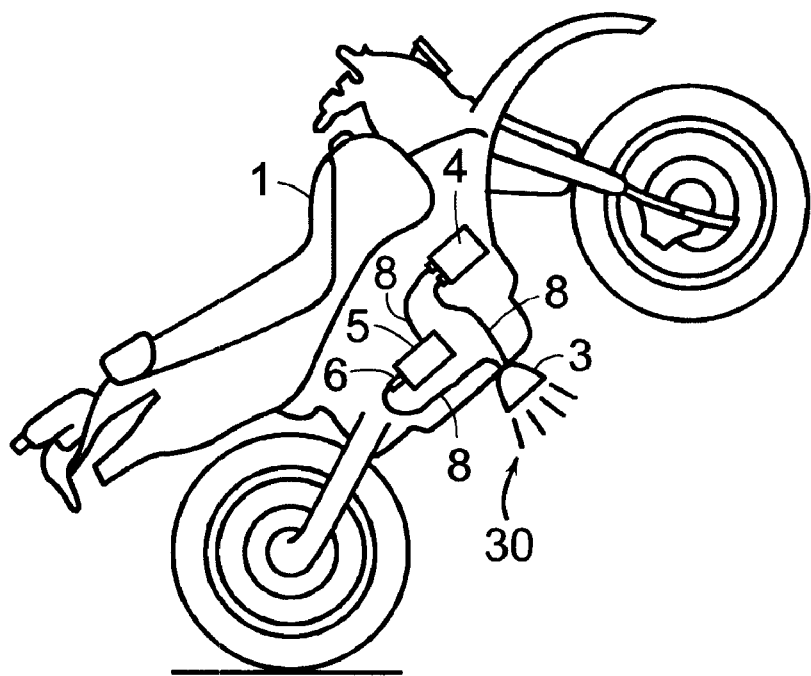
FIG. 2 is a side view of one of the embodiments of the orientation sensitive light for motorcycles and the like mounted on a motorcycle, wherein the motorcycle is shown with a raised front wheel.
Figure 3:
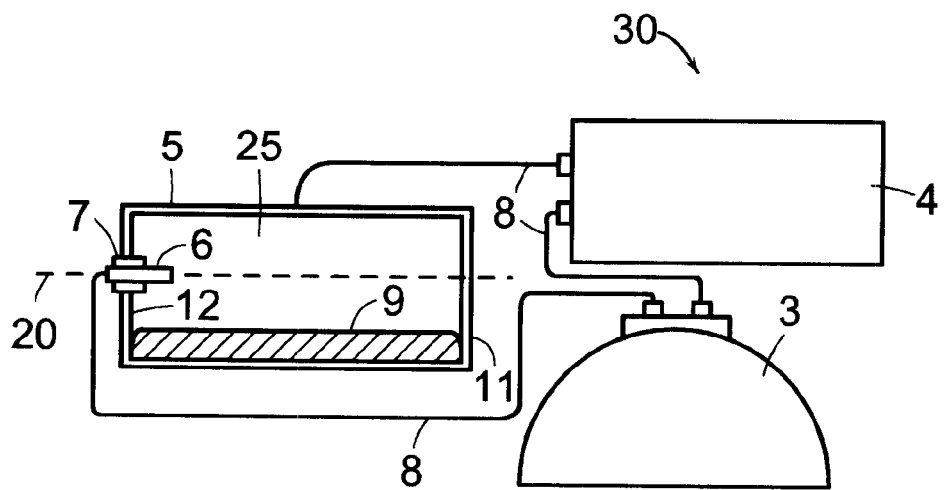
FIG. 3 is a side cross-sectional view of one of the embodiments of the orientation sensitive light for motorcycles and the like in an "off" orientation.
Figure 4:
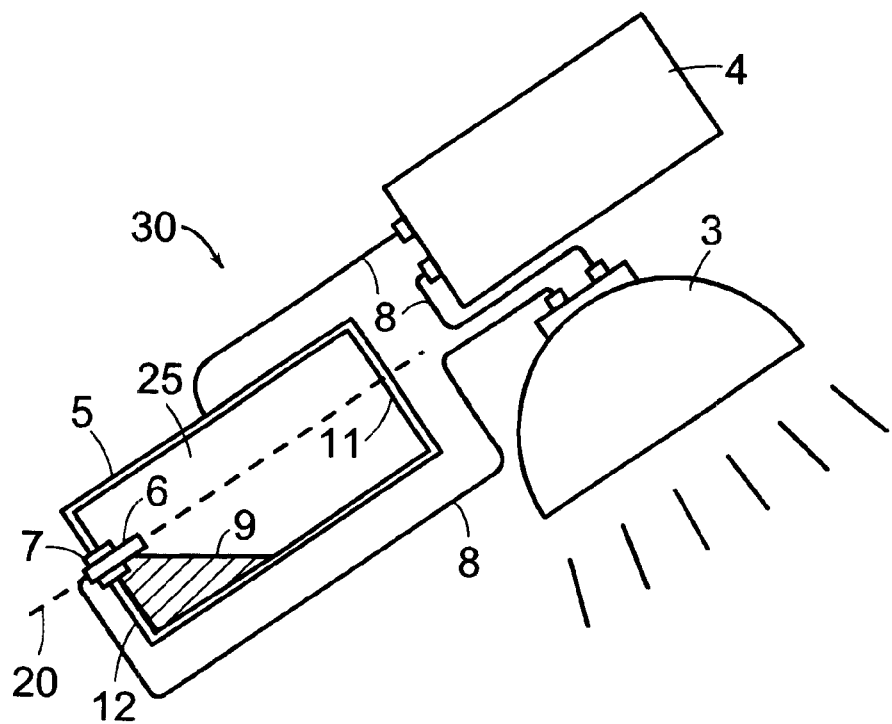
FIG. 4 is a side cross-sectional view of one of the embodiments of the orientation sensitive light for motorcycles and the like in an "on" orientation.
Figure 5:
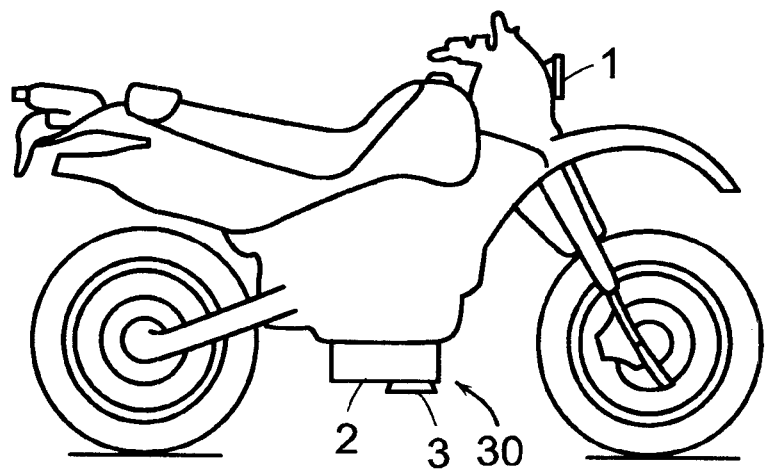
FIG. 5 is a side view of one of the embodiments of the orientation sensitive light for motorcycles and the like mounted on a motorcycle, wherein the motorcycle is shown in a normal operational orientation.
Figure 6:
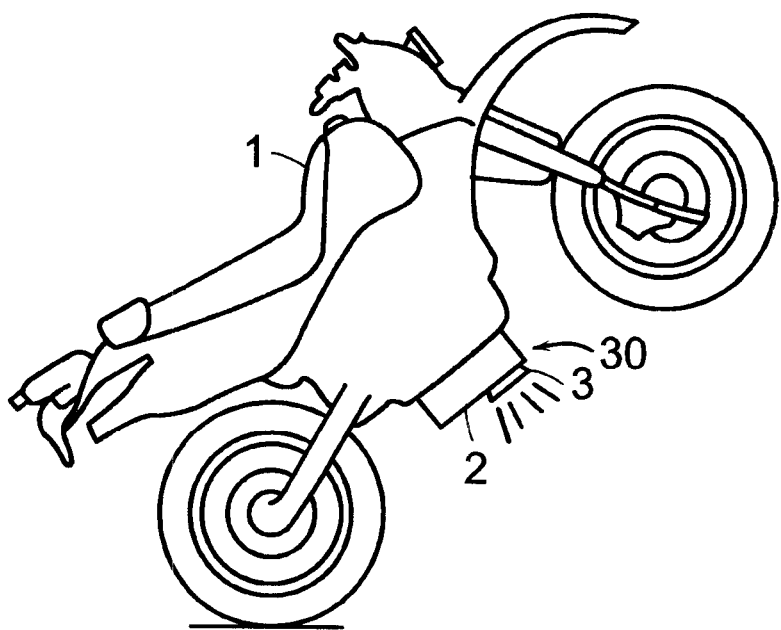
FIG. 6 is a side view of one of the embodiments of the orientation sensitive light for motorcycles and the like mounted on a motorcycle, wherein the motorcycle is shown with a raised front wheel.
Figure 7:
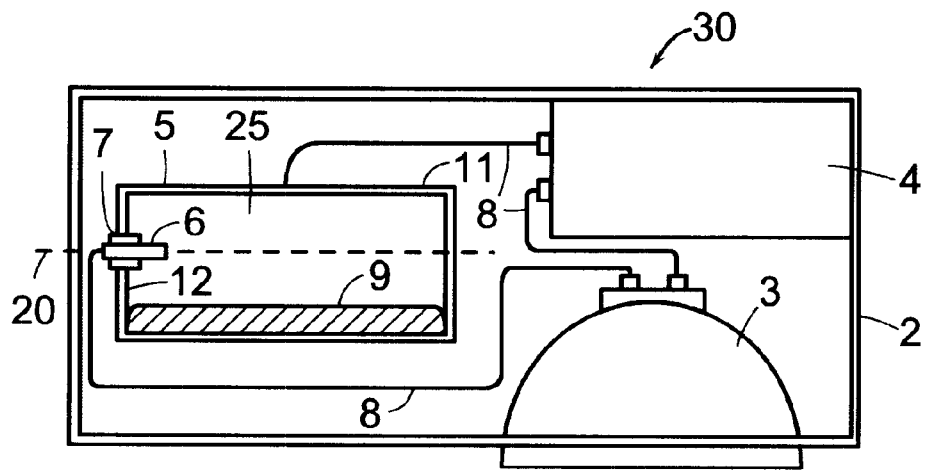
FIG. 7 is a side cross-sectional view of one of the embodiments of the orientation sensitive light for motorcycles and the like in an "off" orientation.
Figure 8:
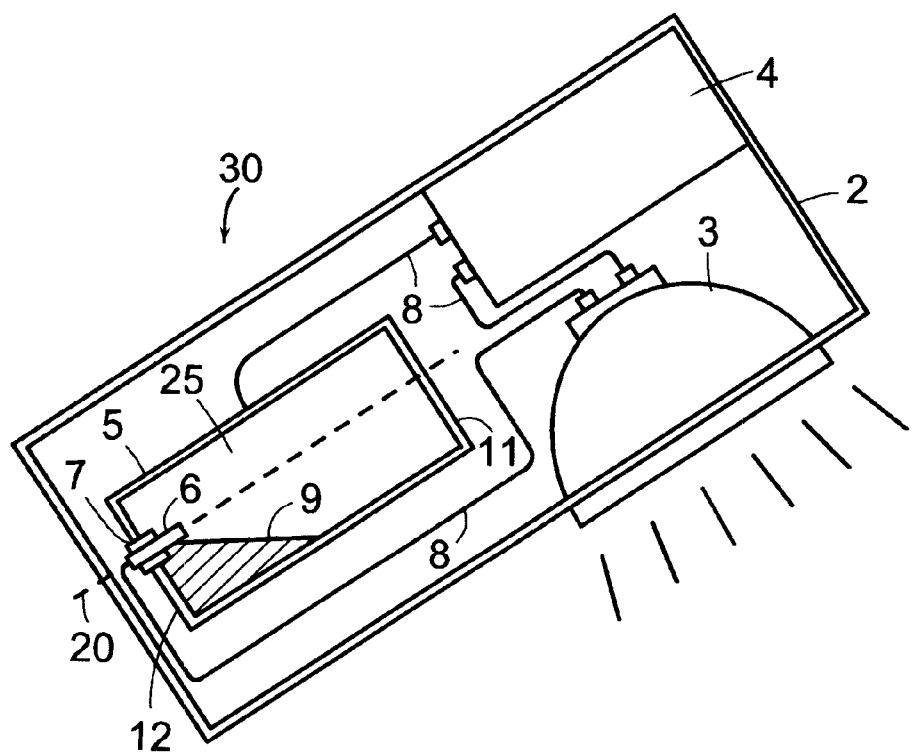
FIG. 8 is a side cross-sectional view of one of the embodiments of the orientation sensitive light for motorcycles and the like in an "on" orientation.
Figure 9:
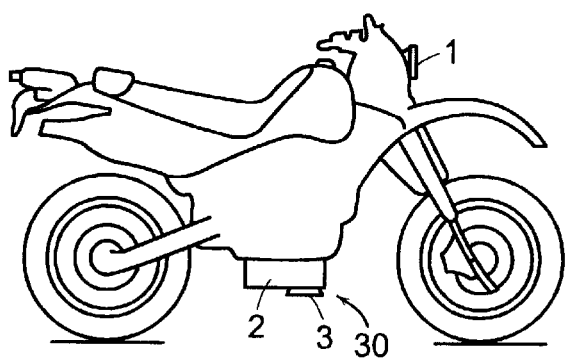
FIG. 9 is a side view of one of the embodiments of the orientation sensitive light for motorcycles and the like mounted on a motorcycle, wherein the motorcycle is shown in a normal operational orientation.

The switch compartment 5 is responsible for activating the light emitter 3 when the rider changes orientation of the motorcycle 1 by raising the front wheel above the ground as depicted in FIGS. 2 and 4. The switch compartment 5 is made out of a conductive material, has a cavity 25, and a longitudinal axis 20, as depicted in FIGS. 3 & 4. The switch compartment 5 has an anterior end 11 and a posterior end 12. A first electrical contact 6 is positioned on the posterior end 12 and protrudes into the cavity 25. The first electrical contact 6 is insulated from the switch compartment 5 by presence of an insulating material 7 between the first electrical contact 6 and the switch compartment 5 as depicted in FIGS. 3 & 4. The cavity 25 stores a quantity of an electrically conductive fluid 9 such as mercury.

When the vehicle 1 is in a normal operational orientation with both wheels on the ground as depicted in FIGS. 1 & 3, the horizontal plane of the vehicle is substantially parallel to the ground. In this orientation the first electrical contact 6 does not come into contact with the conductive fluid 9 and the electric circuit between the power source 4, the switch compartment 5, and the light emitter 3 is broken. Thus the light emitter 3 is not activated.

When the vehicle 1 has its front wheel raised above the ground, as depicted in FIGS. 2 & 4, the horizontal plane of the vehicle is at an angle to the ground. In this orientation the first electrical contact 6 comes into contact with the conductive fluid 9 and the electric circuit between the power source 4, the switch compartment 5, and the light emitter 3 is completed. Thus the light emitter 3 is activated and shines light in front of the vehicle 1.

Two orientation sensitive lights 30 could be mounted on the same vehicle 1 with mirror orientation where the light emitter 3 of one orientation sensitive light 30 will activate upon raising of a front wheel, while another light emitter 3 of the second orientation sensitive light 30 will activate upon raising of a rear wheel.

Alternatively, the components of the orientation sensitive light 30, the power source 4, the switch compartment 5, the light emitter 3, and wires 8, could be all stored inside of a housing member 2 as depicted in FIGS. 5–8 with the same mode of operation as the one described above. This embodiment allows for convenient assemblage of the orientation sensitive light 30. A well known in the art means for attachment of the housing member 2 to a vehicle 1 could be utilized.

DESCRIPTION OF THE PREFERRED EMBODIMENT

The preferred embodiment of the invention is shown in FIGS. 9–14. It has essentially all the elements of the embodiment previously described above and shown in FIGS. 5–8 with exception of some improvements and modifications described below.

Figure 10:
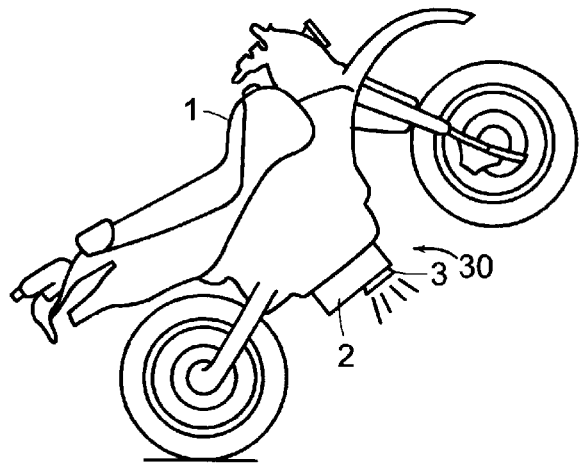
FIG. 10 is a side view of one of the embodiments of the orientation sensitive light for motorcycles and the like mounted on a motorcycle, wherein the motorcycle is shown with a raised front wheel.
Figure 11:
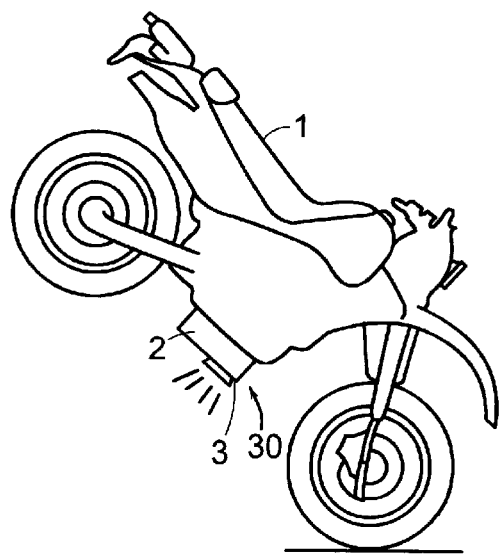
FIG. 11 is a side view of one of the embodiments of the orientation sensitive light for motorcycles and the like mounted on a motorcycle, wherein the motorcycle is shown with a raised rear wheel.
Figure 12:
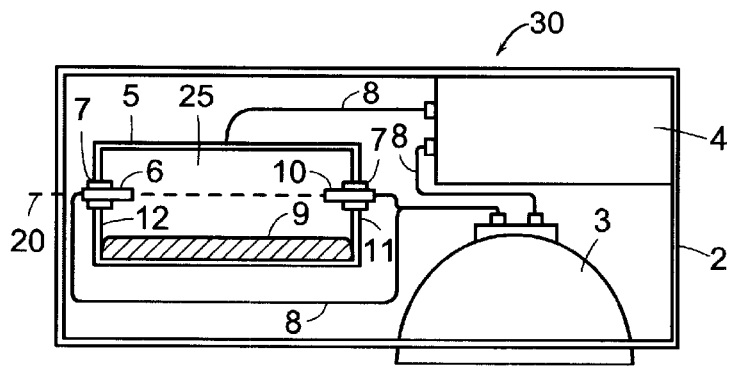
FIG. 12 is a side cross-sectional view of one of the embodiments of the orientation sensitive light for motorcycles and the like in an "off" orientation.
Figure 13:
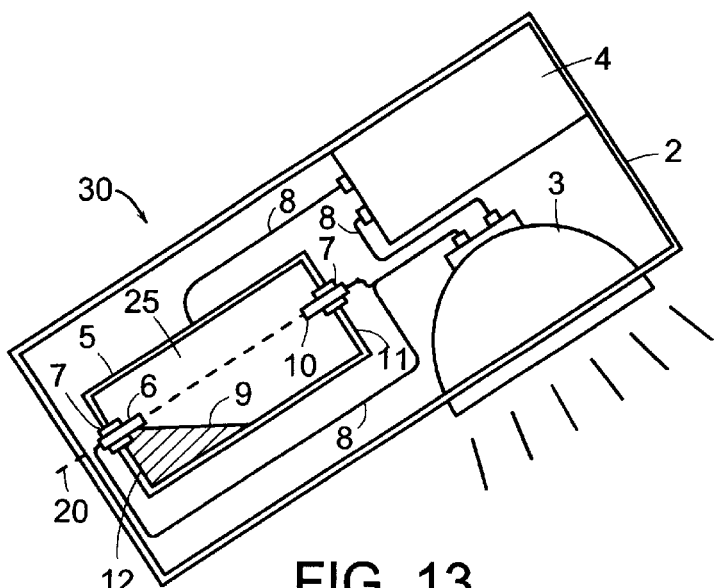
FIG. 13 is a side cross-sectional view of one of the embodiments of the orientation sensitive light for motorcycles and the like in an "on" orientation.
Figure 14:
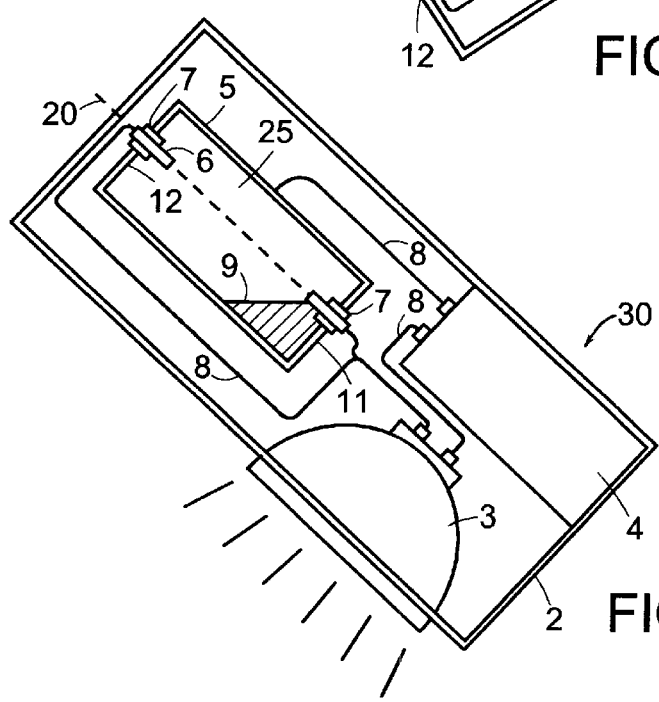
FIG. 14 is a side cross-sectional view of one of the embodiments of the orientation sensitive light for motorcycles and the like in another "on" orientation.

In the preferred embodiment, a second electrical contact 10 is mounted on the anterior end 11 of the switch compartment 5, with the second electrical contact 10 protruding into the cavity 25 and insulated from the switch compartment 5 by insulation 7 as depicted in FIGS. 12–14. The electric circuit is arranged in such a way that it will conduct electricity and activate the light emitter 3 if the conductive fluid 9 makes contact with either the first 6 or the second 10 electrical contact as depicted in FIGS. 13 & 14. Thus, the light emitter 3 will shine light if the front wheel of the vehicle 1 is raised and if the rear wheel is raised as depicted in FIGS. 10 & 11.

Additionally, in a preferred embodiment, depth of the cavity 5 and the amount of the conductive liquid 9 are predetermined to be sufficient for the desired operation of the invention while preventing completion of the electric circuit during normal acceleration of the vehicle when the conductive fluid 9 will tend to move towards one end of the switch compartment 5 while both wheels are on the ground.

What is claimed is:

1. An orientation sensitive light for mounting on a vehicle such as a motorcycle and the like, comprising:

a housing member, having means for attachment to a vehicle;

a light emitter coupled to the housing member, wherein the light emitter points in a downward direction with respect to a horizontal plane of the vehicle;

a switch compartment, stored inside of the housing member, having a longitudinal axis, wherein the switch compartment is conductive, has a cavity, an anterior and posterior ends, at least one first electrical contact extending within the cavity and secured to the posterior end of the switch compartment and communicating with the exterior of and insulated from the switch compartment;

a quantity of electrically conductive liquid stored within the cavity of the switch compartment such that upon deviation of orientation of the switch compartment from a horizontal plane, where the anterior end assumes an elevation that is higher than that of the posterior end, the conductive liquid moves within the cavity and electrically connects the switch compartment and the first electrical contact;

means for forming an electric circuit between an electric power source, the light emitter, the switch compartment, and the first electrical contact.

2. The orientation sensitive light of claim 1 wherein:

the cavity of the switch compartment has a predetermined depth, wherein a quantity of conductive liquid does not electrically connect the switch compartment and the first electrical contact during operationally normal acceleration of the vehicle.

3. The orientation sensitive light of claim 1 wherein:

the conductive liquid is mercury.

4. The orientation sensitive light of claim 1 wherein:

the electric power source is stored inside of the housing member.

5. The orientation sensitive light of claim 1 wherein:

the electric power source is a vehicle battery.

6. An orientation sensitive light for mounting on a vehicle such as a motorcycle and the like, comprising:

a light emitter, affixed to the vehicle, wherein the light emitter points in a downward direction with respect to a horizontal plane of the vehicle;

a switch compartment, affixed to the vehicle, having a longitudinal axis, wherein the switch compartment is conductive, has a cavity, an anterior and posterior ends, at least one first electrical contact extending within the cavity and secured to the posterior end of the switch compartment and communicating with the exterior of and insulated from the switch compartment;

a quantity of electrically conductive liquid stored within the cavity of the switch compartment such that upon deviation of orientation of the switch compartment from a horizontal plane, where the anterior end assumes an elevation that is higher than that of the posterior end, the conductive liquid moves within the cavity and electrically connects the switch compartment and the first electrical contact;

means for forming an electric circuit between an electric power source, the light emitter, the switch compartment, and the first electrical contact.

7. The orientation sensitive light of claim 6 wherein:

the cavity of the switch compartment has a predetermined depth, wherein a quantity of conductive liquid does not electrically connect the switch compartment and the first electrical contact during operationally normal acceleration of the vehicle.

8. The orientation sensitive light of claim 6 wherein:

the conductive liquid is mercury.

9. The orientation sensitive light of claim 6 wherein:

the electric power source is a battery affixed to the vehicle.

10. The orientation sensitive light of claim 6 wherein:

the electric power source is a vehicle battery.

11. An orientation sensitive light for mounting on a vehicle such as a motorcycle and the like, comprising:

a housing member, having means for attachment to a vehicle;

a light emitter coupled to the housing member, wherein the light emitter points in a downward direction with respect to a horizontal plane of the vehicle;

a switch compartment, stored inside of the housing member, having a longitudinal axis, wherein the switch compartment is conductive, has a cavity, an anterior and posterior ends, at least one first electrical contact extending within the cavity and secured to the posterior end of the switch compartment and communicating with the exterior of and insulated from the switch compartment;

a quantity of electrically conductive liquid stored within the cavity of the switch compartment such that upon deviation of orientation of the switch compartment from a horizontal plane, where the anterior end assumes an elevation that is higher than that of the posterior end, the conductive liquid moves within the cavity and electrically connects the switch compartment and the first electrical contact;

means for forming an electric circuit between an electric power source, the light emitter, the switch compartment, and the first electrical contact;

a second electrical contact extending within the cavity and secured to the anterior end of the switch compartment and communicating with the exterior of and insulated from the switch compartment, wherein upon deviation of orientation of the switch compartment from a horizontal plane, where the posterior end assumes an elevation that is higher than that of the anterior end, the conductive liquid moves within the cavity and electrically connects the switch compartment and the second electrical contact; and means for forming an electric circuit between the electric power source, the light emitter, the switch compartment, and the second electrical contact.

12. The orientation sensitive light of claim 11 wherein:

the cavity of the switch compartment has a predetermined depth, wherein a quantity of conductive liquid does not electrically connect the switch compartment and the second electrical contact during operationally normal acceleration of the vehicle.

13. An orientation sensitive light for mounting on a vehicle such as a motorcycle and the like, comprising:

a light emitter, affixed to the vehicle, wherein the light emitter points in a downward direction with respect to a horizontal plane of the vehicle;

a switch compartment, affixed to the vehicle, having a longitudinal axis, wherein the switch compartment is conductive, has a cavity, an anterior and posterior ends, at least one first electrical contact extending within the cavity and secured to the posterior end of the switch compartment and communicating with the exterior of and insulated from the switch compartment;

a quantity of electrically conductive liquid stored within the cavity of the switch compartment such that upon deviation of orientation of the switch compartment from a horizontal plane, where the anterior end assumes an elevation that is higher than that of the posterior end, the conductive liquid moves within the cavity and electrically connects the switch compartment and the first electrical contact;

means for forming an electric circuit between an electric power source, the light emitter, the switch compartment, and the first electrical contact, a second electrical contact extending within the cavity and secured to the anterior end of the switch compartment and communicating with the exterior of and insulated from the switch compartment, wherein upon deviation of orientation of the switch compartment from a horizontal plane, where the posterior end assumes an elevation that is higher than that of the anterior end, the conductive liquid moves within the cavity and electrically connects the switch compartment and the second electrical contact; and means for forming an electric circuit between the electric power source, the light emitter, the switch compartment, and the second electrical contact.

14. The orientation sensitive light of claim 13 wherein:

the cavity of the switch compartment has a predetermined depth, wherein a quantity of conductive liquid does not electrically connect the switch compartment and the second electrical contact during operationally normal acceleration of the vehicle.

\* \* \* \* \*